United States Patent
Kao et al.

(10) Patent No.: US 7,403,556 B2
(45) Date of Patent: Jul. 22, 2008

(54) RADIO RECEIVER SUPPORTING MULTIPLE MODULATION FORMATS WITH A SINGLE PAIR OF ADCS

(75) Inventors: Ping-Chieh Kao, Taipei Hsien (TW); I-Chou Chung, Taipei Hsien (TW); Chingwo Ma, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 632 days.

(21) Appl. No.: 10/710,262

(22) Filed: Jun. 29, 2004

(65) Prior Publication Data

US 2004/0264600 A1 Dec. 30, 2004

Related U.S. Application Data

(60) Provisional application No. 60/483,115, filed on Jun. 30, 2003.

(51) Int. Cl.
*H04B 1/00* (2006.01)
(52) U.S. Cl. .................. 375/147; 375/136; 375/316; 375/340; 375/349
(58) Field of Classification Search .......... 375/340, 375/349, 316, 344, 136, 147, 204, 140; 455/574
See application file for complete search history.

(56) References Cited

U.S. PATENT DOCUMENTS

| | | | | |
|---|---|---|---|---|
| 5,982,819 A * | 11/1999 | Womack et al. | | 375/316 |
| 6,985,545 B2 * | 1/2006 | Teo et al. | | 375/349 |
| 7,161,997 B2 * | 1/2007 | Spiegel et al. | | 375/350 |
| 7,200,196 B2 * | 4/2007 | Li et al. | | 375/355 |
| 2004/0029620 A1 * | 2/2004 | Karaguz | | 455/574 |
| 2004/0223449 A1 * | 11/2004 | Tsuie et al. | | 370/204 |
| 2007/0091866 A1 * | 4/2007 | Nangia et al. | | 370/344 |

* cited by examiner

*Primary Examiner*—Shuwang Liu
*Assistant Examiner*—Hirdepal Singh
(74) *Attorney, Agent, or Firm*—Winston Hsu

(57) ABSTRACT

A radio receiver has an ADC connected to an RF module. Baseband processing modules are connected to the ADC, and a power control module is connected to each of the baseband processing modules. Each of the baseband processing modules is capable of performing detection, demodulation, time and frequency synchronization, decoding, and de-scrambling of signals of a respective modulation format among numerous modulation formats. At least one of the baseband processing modules also has a rate converter connected to the ADC for converting a data rate of signals output from the ADC to a data rate of the corresponding modulation format of that baseband processing module. The power control module is connected to the baseband processing modules and controls power to the baseband processing modules according to signals received from the baseband processing modules.

15 Claims, 10 Drawing Sheets

| Mode | Provided data rate(Mbps) | Sample rate(Mbps) | Carrier frequency (GHz) | Modulation |
|---|---|---|---|---|
| IEEE 802.11a | 6, 9, 12, 18, 24, 36, 48, 54 | 20 | 5 | OFDM |
| IEEE 802.11b | | 22 | 2.4 | CCK/DSSS |
| IEEE 802.11g | 6, 9, 12, 18, 24, 36, 48, 54 | 20, 22 | 2.4, 5 | OFDM, CCK/DSSS |

Fig. 1 Prior Art

RADIO RECEIVER SUPPORTING MULTIPLE MODULATION FORMATS WITH A SINGLE PAIR OF ADCS

CROSS REFERENCE to RELATED APPLICATIONS

This application claims the benefit of U.S. Provisional Application No. 60/483,115, filed Jun. 30, 2003, and included herein by reference.

BACKGROUND OF INVENTION

1. Field of the Invention

The present invention relates to a radio receiver, and more particularly, to a radio receiver that is capable of supporting multiple modulation formats with a single pair of analog to digital converters (ADCs).

2. Description of the Prior Art

This is the age of radio communications. Around the world, cell phones are now one of the most common pieces of equipment to be found among the general public. Wireless local area network (WLAN) is an acknowledged trend for business and consumer networking environments. The mobility enabled by wireless connections has dramatically changed and improved the lives of ordinary people. However, there is no universal standard for wireless modulation formats. For example, there are digital enhanced cordless telecommunications (DECT), global system for mobile communications-900 (GSM-900), GSM-1800, wideband code division multiple access (WCDMA), and code division multiple access 2000 (CDMA2000) systems for mobile telephony. Another situation is that there may be multiple modes within a standard. For example, there are orthogonal frequency division multiplexing (OFDM) modes and direct sequence spread-spectrum/complementary code keying (DSSS/CCK) modes within the Institute of Electrical & Electronics Engineers (IEEE) 802.11g standard. For mobile telephony systems base stations supporting multiple formats, signals of different standards need to be dealt with simultaneously. On the other hand, on the mobile station end, only one signal standard needs to be supported at the same time. For example, a base station that supports both GSM-1800 and WCDMA standards needs to deal simultaneously with signals modulated according to these formats. But a cell phone needs to receive or transmit signals of only one standard at one time.

The IEEE 802.11 WLAN standard provides a number of physical layer options in terms of data rates, modulation types and spreading spectrum technologies. Please refer to FIG. 1. FIG. 1 illustrates provided data rates, sample rates, carrier frequencies and modulation types for various modes of IEEE WLAN standard. An extension of the IEEE 802.11 standard, namely IEEE 802.11a, defines requirements for a physical layer operating in the 5 GHz frequency and data rates ranging from 6 Mps to 54 Mps. IEEE 802.11a defines a physical layer based on the orthogonal frequency division multiplexing (OFDM) modulation scheme. A second extension, IEEE 802.11b, defines a set of physical layers' specifications operating in the 2.4 GHz industrial, scientific, and medical (ISM) frequency band up to 11 Mps. The direct sequence spread spectrum/complementary code keying (DSSS/CCK) physical layer is one of the three physical layers supported in the IEEE 802.11 standard and uses the 2.4 GHz frequency band as the RF transmission media.

The IEEE standard committee has created a working group, TGg, with the mission of developing a higher speed PHY extension to the 802.11b standard. The 802.11g standard will be compatible with the IEEE 802.11 MAC and will implement all mandatory portions of the IEEE 802.11b PHY standard. A part of the scope of TGg is to provide a wireless LAN standard where stations communicating in OFDM modulation and legacy stations communicating in DSSS/CCK modulation coexist and communicate with each other.

In a multiple mode standard, like IEEE 802.11g, signals of both the OFDM mode and the DSSS/CCK mode need to be dealt with, but only one mode can be performed at a time. All of these standards have been extensively adopted and have their own features and market niches. As a result, systems supporting multiple modulation formats are highly desirable.

Recently, technological advances in the design of programmable computing devices have made possible the real-time processing of algorithms formerly implemented by ASIC circuits, and this is especially true in the field of telecommunications. Thus, the complexity of transceivers can be partly moved from hardware to software. Moreover, due to the high level of reconfigurability, improved algorithms or newer versions of the transmission standards can be downloaded to the terminal, avoiding the need for hardware upgrades. Under this scenario, the adoption of a single user terminal, capable of interfacing with different transmission standards, opens the door to an enlarged set of services that can be delivered to the end user, with complete independence of the air interface if proper techniques are chosen. For example, there are now available dual-system or even tri-system cell phones. There also exist IEEE 802.11g WLAN cards supporting both the OFDM DSSS/CCK modes.

Please refer to FIG. 2. FIG. 2 is a block diagram of a dual-system receiver R1 according to the prior art. Receiver R1 is a zero-IF radio architectured receiver for a mobile phone supporting both GSM-1800 and FDD WCDMA standards. The two systems operate in different radio frequency bands and at different data rates. Because of the different radio frequency bands, two radio frequency (RF) modules 10 and 20 are required to complete band selection, low noise amplification, down-conversion, and channel selection, as some of these functions are performed by frequency-selective components. Because the data rates of the two standards are different, and the modulations have an I/Q structure, two pairs of analog to digital converters (ADCs) 12 and 22 are adopted to sample the analog signals. The respective sampling rates of the two pairs of ADCs are in accordance with the modulation formats for GSM-1800 and the FDD WCDMA standard. Two baseband processing modules 14 and 24 are respectively electrically connected to the two pairs of ADCs 12, 22, and each takes responsibility for performing detection, demodulation, time and frequency synchronization, decoding, and de-scrambling of signals of the respective predetermined standard.

Please refer to FIG. 3. FIG. 3 is a block diagram of another two-standard receiver R2 according to the prior art. Receiver R2 is a zero-IF radio architectured receiver for a WLAN card supporting IEEE 802.11g standard. As mentioned above, there are OFDM modes and DSSS/CCK modes within the IEEE 802.11g standard. The radio frequency bands of the two modes are the same, but the modulation formats and data rates are different. Since the radio frequency bands are the same, the RF module 30 is shared by the two modes. As I/Q structures are adopted in each of the modes, electrically connected to the RF module 30 are two pairs of ADCs 32 and 42. The two pairs of ADCs are capable of sampling the analog signals, and the sampling rate of each ADC pair corresponds to the data rate of the respective predetermined mode. Similarly, two baseband processing modules 34 and 44 are respectively electrically connected to the two ADCs 32, 42, providing functionality like that of the baseband processing modules 14 and 24 in receiver R1.

It is easily seen that there are duplicated analog circuits, especially the ADC circuits, in a receiver supporting multiple modulation formats of the prior art. The ADC circuits usually have very complicate configuration, and the area occupied by these circuits can be relatively large. Hence, the ADCs present a severe drawback in the design and manufacture of integrated circuits. The larger the area of a circuit is, the higher the total cost becomes. In addition, in a user terminal supporting multiple standards or multi-mode standards, only one signal modulation format needs to be handled at one time. There is no need to waste power on paths other than that which is receiving or transmitting the signals.

SUMMARY OF INVENTION

It is therefore a primary objective of the claimed invention to provide a radio receiver that can support multiple modulation formats with a single pair of ADCs and a power control module.

Briefly described, the claimed invention discloses a radio receiver capable of supporting a plurality of modulation formats. The radio receiver comprises an ADC electrically connected to an RF module for processing output signals of the RF module, a plurality of baseband processing modules electrically connected to the ADC, and a power control module electrically connected to each of the plurality of baseband processing modules. Each of the baseband processing modules is capable of performing detection, demodulation, time and frequency synchronization, decoding, and de-scrambling of signals of a respective predetermined modulation format among the plurality of modulation formats. At least one of the baseband processing modules further comprises a rate converter respectively electrically connected to the ADC for converting a data rate of signals output from the ADC to a data rate of the corresponding predetermined modulation format. The power control module is electrically connected to each of the baseband processing modules, and is capable of controlling power to the baseband processing modules according to first signals respectively received from each of the baseband processing modules.

The claimed invention further discloses a radio receiver capable of supporting a plurality of modulation formats. The radio receiver comprises an ADC electrically connected to the RF module for processing the output signals of the RF module, and a plurality of baseband processing modules electrically connected to the ADC. Each of the baseband processing modules is capable of performing detection, demodulation, time and frequency synchronization, decoding, and de-scrambling of signals of a respective predetermined modulation format among the plurality of modulation formats. At least one of the baseband processing modules further comprises a rate converter respectively electrically connected to the ADC for converting a data rate of signals output from the ADC to a data rate of the corresponding predetermined modulation format.

It is an advantage of the present invention that use of the rate converter enables elimination of a corresponding pair of ADCs. As rate converters are considerably easier to implement than ADCs, a significant saving in circuit complexity, and hence area, is obtained. This results in lower overall manufacturing costs of the radio receiver. Furthermore, the use of the power control module avoids wasting power on paths other than the path that is receiving or transmitting signals, which can lead to longer battery life.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 1 illustrates provided data rates, sample rates, carrier frequencies and modulation types for various modes of IEEE WLAN standard.

DETAILED DESCRIPTION

The primary reason for adopting multiple ADC pairs in a system supporting a plurality of modulation formats according to the prior art is that the data rates of the different modes or different standards are not the same. Each of the modes or standards needs to adopt an ADC pair having a predetermined sampling rate that matches the sampling rate of that mode or standard. Taking IEEE 802.11g, which is a multi-mode standard, as an example, if we want a WLAN card to support the IEEE 802.11g standard, then we have to deal with a 64 QAM modulation format signal with a 20 MHz data rate for the OFDM mode, and a QPSK modulation format signal with a 22 MHz data rate for the DSSS/CCK mode, but only for one mode in a time. Similarly, in a multi-system cell phone supporting both GSM-1800 and WCDMA mobile telephony systems, both of the two modulation formats need to be dealt with, but the signals of different types of modulation formats are not utilized at the same time. The data rates of the two modes within the IEEE 802.11g standard or the data rates of GSM-1800 and WCDMA systems are different. Therefore, respective ADC pairs of different sampling rates are needed for the IEEE 802.11g WLAN card and the dual-system cell phone supporting both GSM-1800 and FDD-WCDMA according to the prior art.

In the present invention, only one ADC (or ADC pair) is adopted to implement the multi-mode or multi-standard radio receiver. A rate converter (or rate converter pair) is further provided in at least one of the baseband processing modules to convert the data rate of the signals sampled by the ADC (or ADC pair). In this manner, the data rates of signals for each modulation format are all converted to the predetermined rates suitable for that format, and the baseband processing modules can therefore function correctly. There is further provided a power control module in the present invention to reduce the power consumption of the baseband processing modules other than the one that is receiving or transmitting signals, since there is always only one signal modulation format processed at one time.

First Embodiment

Figure 2:
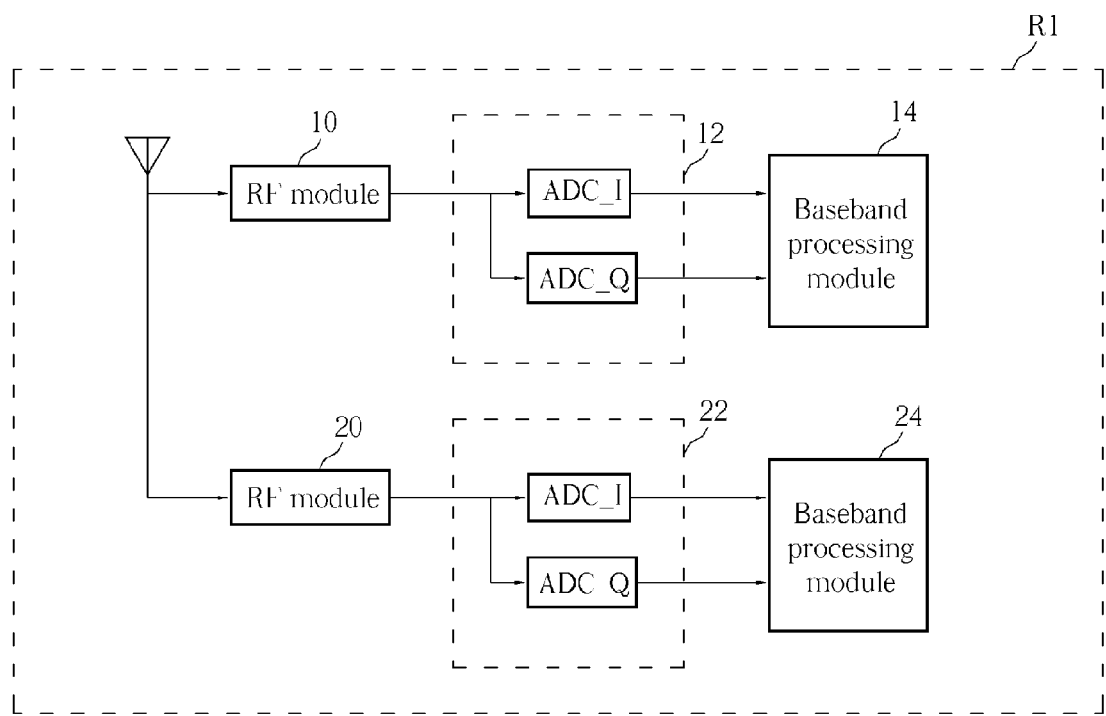
FIG. 2 is a block diagram of a prior art multi-mode receiver having a zero-IF structure supporting different radio frequency bands and data rates.
Figure 3:
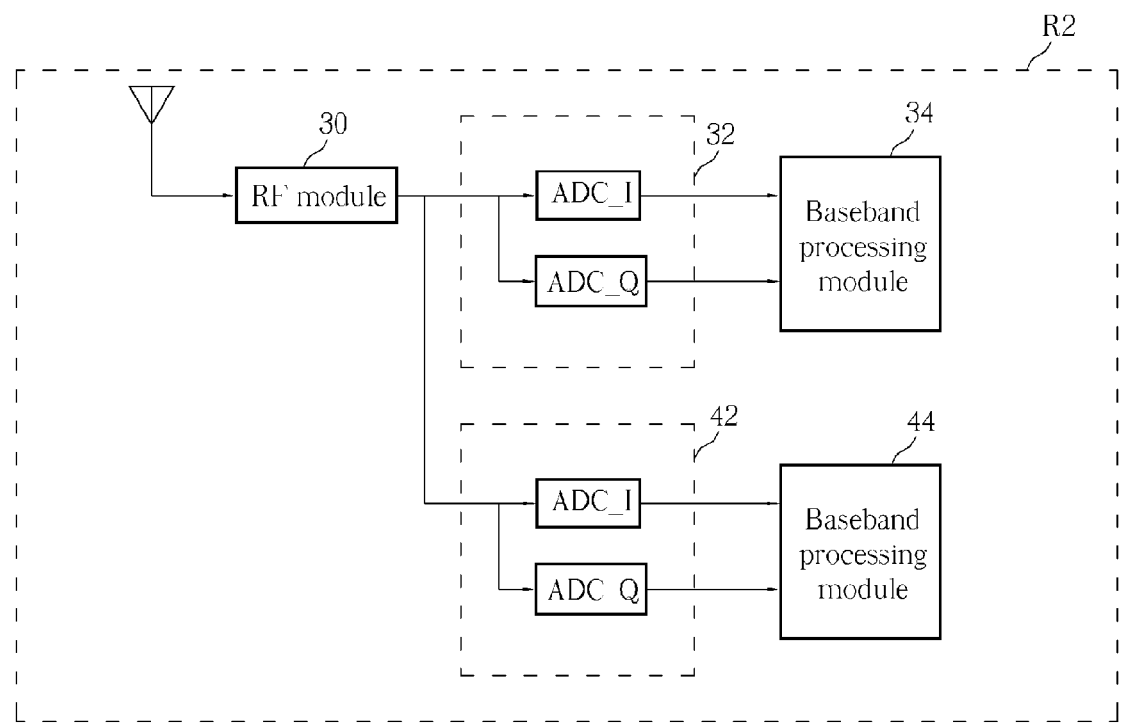
FIG. 3 is a block diagram of a prior art multi-mode receiver having a zero-IF structure supporting standards with which the radio frequency bands are close but the data rates are different.
Figure 4:
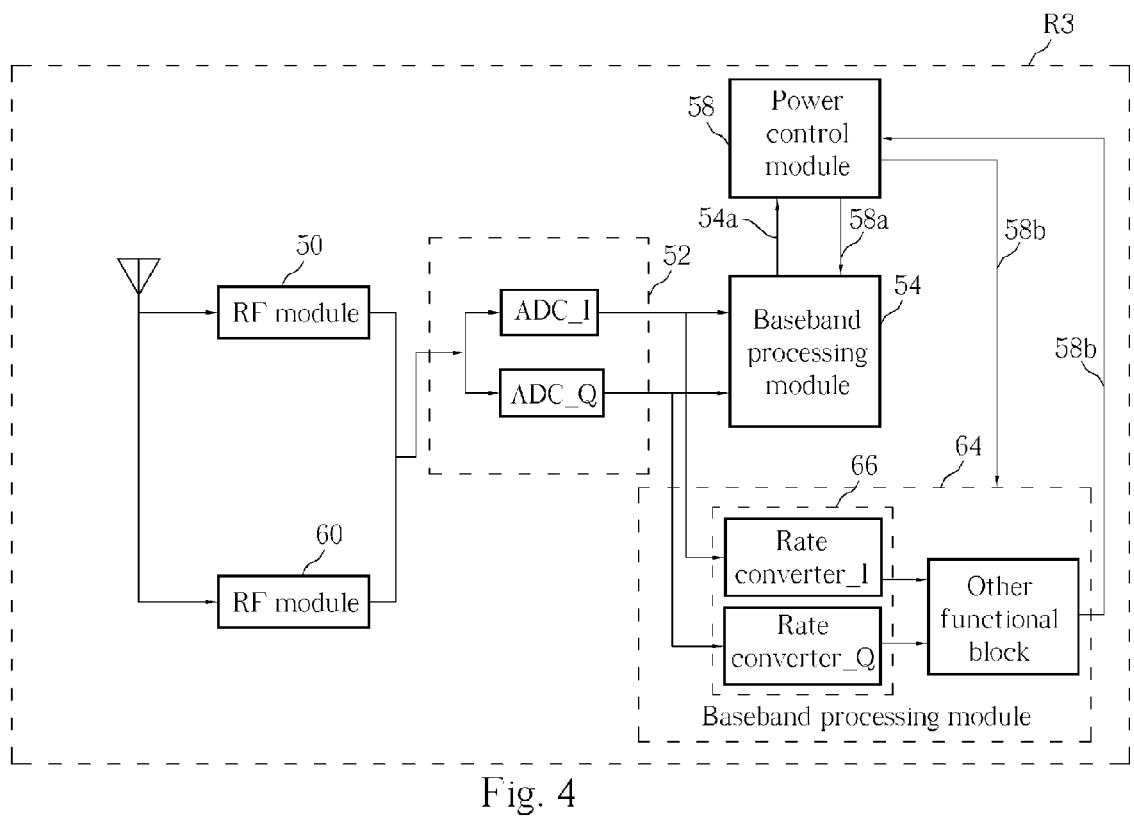
FIG. 4 is a block diagram of a present invention multi-mode receiver having a power control and a zero-IF structure module that supports standards having different radio frequency bands and data rates.

Please refer to FIG. 4. FIG. 4 is a block diagram of a multi-standard receiver R3 according to the present invention. The receiver R3 is a zero-IF radio architectured receiver for a dual-system cell phone supporting both GSM-1800 and FDD-WCDMA standards. The radio frequency bands of the two systems are different, and the data rates are 200 KHz and 3.84 MHz, respectively. For the different radio frequency bands, radio frequency (RF) modules 50 and 60 are utilized to complete band selection, low noise amplification, down-conversion, and channel selection. The RF modules 50 and 60 are electrically connected to the same pair of ADCs 52. The sampling rate of the ADCs is chosen to be 7.68 MHz, which is twice the sampling rate of the highest modulation format data rate. By doubling the greatest data rate as the sampling rate, proper sampling is assured for all modulation format data rates. Two baseband processing modules 54 and 64 are electrically connected to the pair of ADCs 52. The baseband processing module 54 takes the responsibility of performing detection, demodulation, time and frequency synchronization, decoding, and de-scrambling of signals modulated for the FDD-WCDMA standard. The data rate of the signal sampled by the ADC pair 52 is twice the data rate of the FDD-WCDMA standard, and is therefore appropriate for the baseband processing module 54 to perform its various functions. On the other hand, the data rate of the signal sampled by the ADC pair 52 is not appropriate for the baseband processing module 64. To convert the data rate, the baseband processing module 64 further comprises a pair of rate converters 66 electrically connected to the pair of ADCs 52 for converting the data rate of signals output from the pair of ADCs 52 to the data rate suitable for the GSM-1800 standard (i.e., 400 KHz). The most common structures for the rate converters 66 are Farrow Interpolators or Decimation Filters. The baseband processing module 64 is also responsible for performing detection, demodulation, time and frequency synchronization, decoding, and de-scrambling of signals modulated under the MSK format of the GSM-1800 standard. Since the 7.68 MHz data rate output by the ADC pair 52 is converted to a 400 KHz data rate suitable for the GSM-1800 baseband processing module 64, the tasks of the baseband processing module 64 can be performed correctly. When a first baseband processing module 54, 64 detects signals of the respective predetermined format of the first baseband processing module 54, 64, it sends a first signal 54a, 64a to the power control module 58. The power control module 58 then turns all other baseband processing modules 64, 54 into a low power consumption mode except the first baseband processing module 54, 64, by way of control lines 58b, 58a. For example, if WCDMA signals are detected first, the baseband processing module 54 sends a first signal 54a to the power control module 58. In response, the power control module 58 puts the baseband processing module 64 into a low power mode by asserting a signal line 58b to save power, since there is no need to concurrently process GSM-1800 signals. When the transmission procedures of the baseband processing modules 54, 64 have completed (in the example, baseband module 54), the power control module 58 restores power to each baseband processing module 64, 54 (in the example, power is restored to baseband processing module 64 by de-asserting the signal line 58b). Determination of when transmission procedures of the baseband processing modules 54, 64 are completed can be obtained, for example, from the first signal lines 54a, 64a and then waiting a predetermined period of time (which may be zero) before de-asserting all power control lines 58a, 58b.

Utilization of rate converters can bring distortion into signals. The modulation format of GSM-1800 is less prone to distortions than that of the FDD-WCDMA modulation format. That is, Minimum Shift Keying (MSK) is more robust than quadrature phase shift keying (QPSK). Consequently, another reason for choosing the sampling rate of the pair of ADCs 52 to be twice the data rate of the FDD-WCDMA standard is that it is consequently not necessary to adopt the rate converters in the baseband processing module 54, and hence there is no further distortion to the FDD-WCDMA signal. Also, according to the Nyquist theorem and as indicated above, the sampling rate of the ADCs 52 should be at least twice the highest data rate of all supported standards; that is, higher than or equal to 7.68 MHz in this example.

In consider of circuit simplification, the sampling rate of the ADCs 52 can also be as the same as the highest data rate among all support standards, such that the output of the ADCs 52 can be fed into the baseband processor with the highest data rate without a sample rate converter therebetween. In this embodiment, the sampling rate of the ADCs 52 can be chosen as 3.84 MHz, which is the same as the data rate of the FDD-WCDMA standard. Under this assumption, the baseband processing module 54, which is for the FDD-WCDMA standard, does not need a sample rate converter since its date rate is the same as the sample rate of the ADCs 52. The baseband processing module 64, which is for the GSM-1800 standard, does require a sample rate converter to down convert the data rate from 3.84 MHz to 200 KHz.

Second Embodiment

Figure 5:
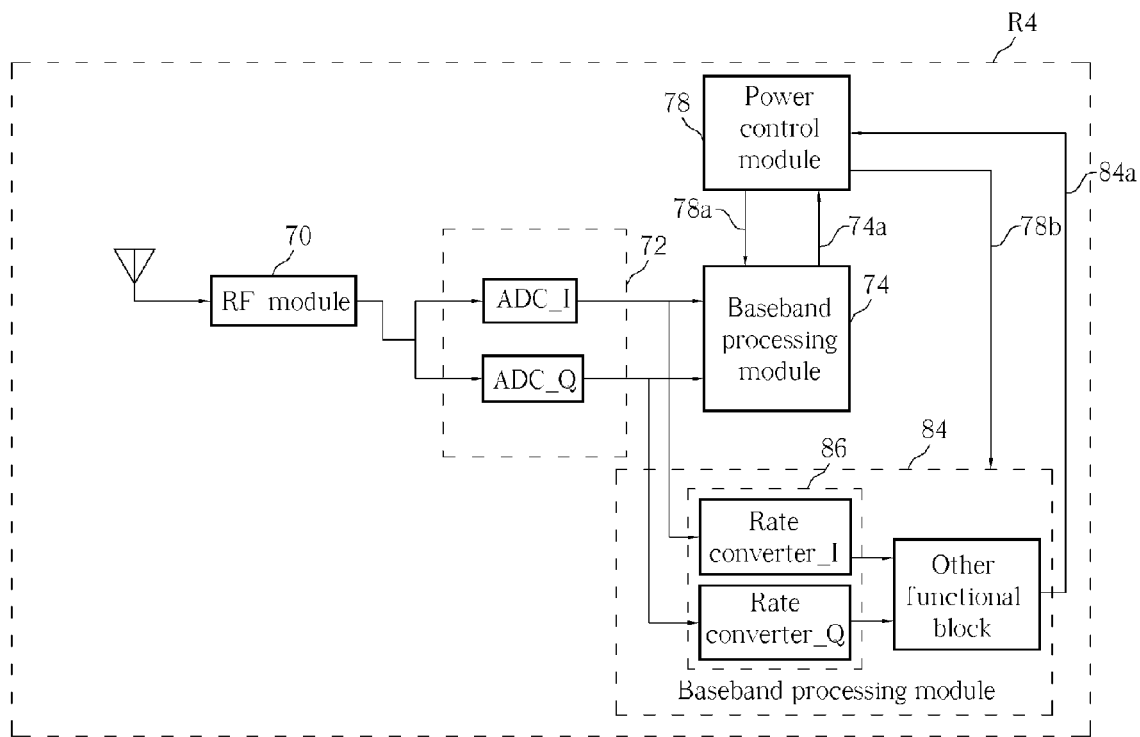
FIG. 5 is a block diagram of a present invention multi-mode receiver having a power control module and a zero-IF structure that supports standards in which the radio frequency bands are close to one another but the data rates are different.

FIG. 5 is a block diagram of a dual-mode receiver R4 according to the present invention. As shown in FIG. 5, the receiver R4 is a zero-IF radio architectured receiver for a user terminal supporting the IEEE 802.11g standard. The radio frequency bands for the OFDM mode and DSSS/CCK mode are both at 2.4 GHz, and the data rates are 20 MHz and 22 MHz respectively. Since the radio frequency bands are the same, a single RF module 70 is utilized and shared for the two modulation standards. A pair of ADCs 72 is electrically connected to the RF module 70. The modulation format of OFDM mode is 64 QAM, and that of DSSS/CCK mode is QPSK. QPSK is lees prone to distortion than 64 QAM. According to the principle for choosing the sampling rate of the ADCs as described above, the sampling rate of the ADCs is chosen to be at least twice the data rate of the QPSK format of DSSS/CCK mode, that is, 44 MHz, and to be a multiple of the data rate of the 64 QAM format of OFDM mode. Therefore, we choose 60 MHz as the sampling rate of the pair of ADCs 72. Two baseband processing modules 74 and 84 are electrically connected to the pair of ADCs 72. The baseband processing module 74 is responsible for performing detection, demodulation, time and frequency synchronization, decoding, and de-scrambling of signals modulated under the 64 QAM format for the OFDM mode. To convert the output data rate of the paired ADCs 72, the baseband processing module 84 further comprises a pair of rate converters 86 respectively electrically connected to the pair of ADCs 72 for converting the data rate of the signal output from the pair of ADCs 72 to a data rate suitable for the DSSS/CCK mode (i.e., 44 MHz). The baseband processing module 84 is responsible for performing detection, demodulation, time and frequency synchronization, decoding, and de-scrambling of signals modulated under the QPSK format for the DSSS/CCK mode of the IEEE 802.11g standard. Since the data rate is converted, the task of the baseband processing module 84 can be performed correctly. When a first baseband processing module 74, 84 detects signals of the respective predetermined format of the first baseband processing module 74, 84, it sends a first signal 74a, 84a to the power control module 78. The power control module 78 then turns all other baseband processing modules 84, 74 into a low power mode, excepting the first baseband processing module 74, 84, by way of power control lines 78b, 78a. For example, if the user terminal first detects OFDM signals, the baseband processing module 74 sends a first signal 74a to the power control module 78. In response, the power control module 78 then forces the baseband processing module 84 into a low power mode by way of the signal line 78b to save power, since there is no need to simultaneously process DSSS/CCK signals. When the transmission procedures of the baseband processing modules 74, 84 are completed, the power control module 78 turns on the power of each baseband processing module by de-asserting the power control lines 78b, 78a.

The present invention uses only one ADC for non-I/Q structured signals, or one pair of ADCs for I/Q structured signals, in a radio receiver supporting multiple modulation formats. The sampling rate of the only one ADC or the only one pair of ADCs should satisfy two requirements: (1) The sampling rate should be at least twice the highest data rate of all supported standards; and (2) the data rate should be n times the data rate of the most complicated (or least distortion-tolerant) modulation format, where n is an integer. Having the data rate an integer multiple of the most complicated format helps to avoid utilizing a rate converter in the baseband processing module of the most complicated modulation format, and thus avoids signal distortion within that format. Second, the present invention uses a power control module. The power control module sets the baseband processing modules into a low power mode, except for the first baseband processing module that first detects signals, since there is no need for signals of more than one modulation format to be concurrently processed in the application of the present invention. The power control module turns on the power of each baseband processing module when transmission procedures of the baseband processing modules are completed. In this manner, power is saved.

Figure 6:
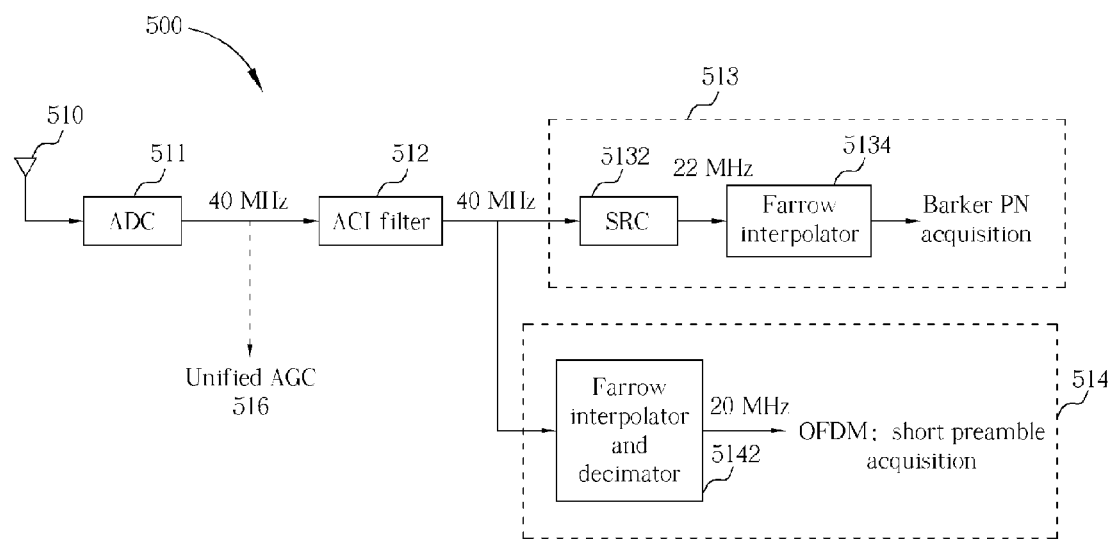
FIG. 6 is a block diagram of a dual mode receiver according to the present invention.

The dual mode receiver of the invention includes two kinds of modulation format, i.e. OFDM modulation for IEEE 802.11a standard and DSSS/CCK modulation for IEEE 802.11b standard. Please refer to FIG. 6. FIG. 6 is a block diagram of a dual mode receiver 500 according to the present invention. The dual mode receiver 500 includes a common ADC (analog-to-digital converter) 511, an AGC (automatic gain control) 516, an ACI (adjacent channel interference) filter 512, a first demodulation circuit 513 and a second demodulation circuit 514. The ADC 511 converts a baseband signal into a primary digital signal with a basic data rate of 40 MHz. The AGC 516 adjusts the gain of the primary digital signal. The ACI filter 512 filters the adjusted primary digital signal to remove adjacent channel interference. The first demodulation circuit 513 comprises an SRC (sample rate converter) 5132 connected to the ACI filter 512, and a Farrow Interpolator 5134 connected to the SRC 5132. The SRC 5132 converts the primary digital signal with a basic data rate of 40 MHz to a digital signal with a data rate of 22 MHz. The Farrow Interpolator 5134 then performs timing recovery to synchronize the digital signal. The second demodulation circuit 514 comprises a Farrow Interpolator and Decimator 5142 for converting the primary digital signal with a basic data rate of 40 MHz to a digital signal with a data rate of 20 MHz. The digital signal with a data rate of 20 MHz is generated by decimating the primary digital signal with a basic data rate of 40 MHz, not by sampling because the Farrow interpolator and decimator 5142 can decimate an input signal whose frequency is an integer multiple of the frequency of an output signal generated by the Farrow interpolator and decimator 5142. Although in this embodiment, the SRC 5132 is used to convert the primary digital signal with a basic data rate of 40 MHz to a digital signal with a data rate of 22 MHz, the SRC 5132 can be ignored so that the ACI filter 512 can directly input the primary digital signal with a basic data rate of 40 MHz to the Farrow interpolator 5134.

Third Embodiment

Figure 7:
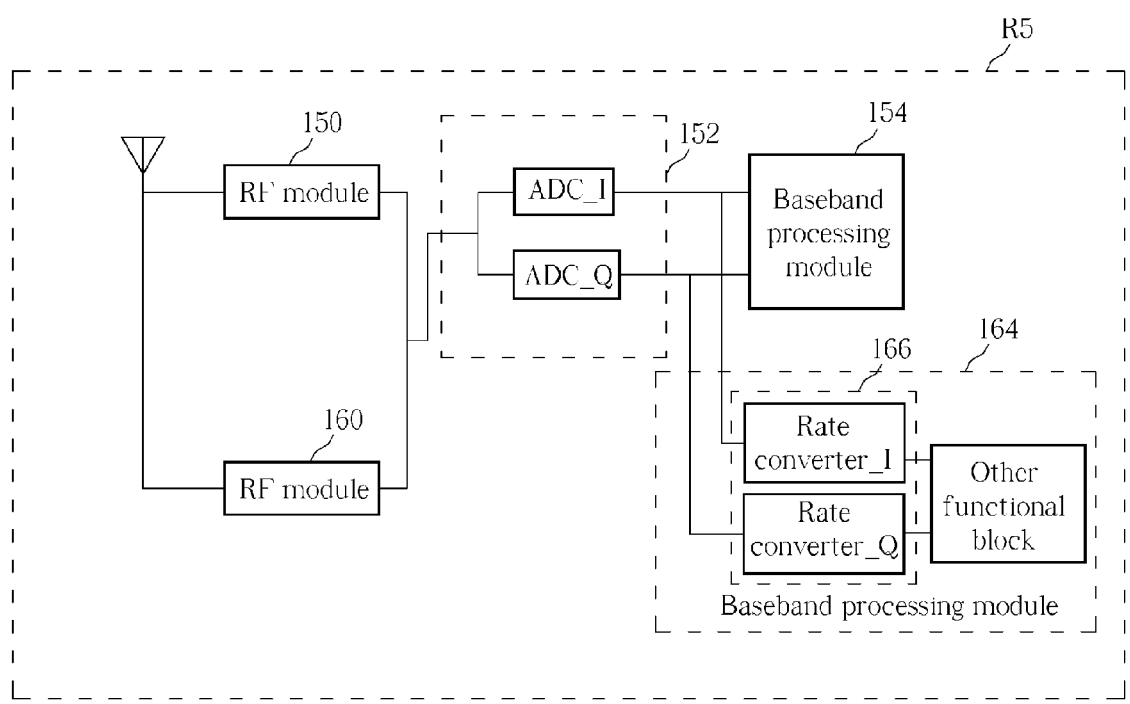
FIG. 7 is a block diagram of a present invention multi-standard receiver having a zero-IF structure that supports standards having different radio frequency bands and data rates.

Please refer to FIG. 7. FIG. 7 shows an embodiment for a multi-standard receiver R5 of the present invention. Please refer to FIG. 7. FIG. 7 is a block diagram of a multi-standard receiver R5 according to the present invention. The receiver R5 is a zero-IF radio architectured receiver for a PDA or other computing platform equipped with a WLAN card supporting the IEEE 802.11a standard, and capable of providing household appliance remote control functionality via the BLUETOOTH standard. The radio frequency bands of the two systems are 5.0 GHz and 2.4 GHZ, and the data rates are 20 MHz and 1 MHz. For the different radio frequency bands, radio frequency (RF) module 150 and 160 are utilized to complete band selection, low noise amplification, down-conversion, and channel selection. The two RF modules 150, 160 are electrically connected to the same pair of ADCs 152. The sampling rate of the ADCs is chosen to be 40 MHz, which is twice the sampling rate of the highest modulation format data rate. By doubling the greatest data rate as the sampling rate, proper sampling is assured for all modulation format data rates. Two baseband processing modules 154 and 164 are electrically connected to the pair of ADCs 152. The baseband processing module 154 takes the responsibility of performing detection, demodulation, time and frequency synchronization, decoding, and de-scrambling of signals modulated with the 64 QAM format for the 802.11a standard. The data rate of the signal sampled by the ADC pair is twice the data rate of the IEEE 802.11a standard, and is therefore appropriate for the baseband processing module 154 in performing its various functions. On the other hand, the data rate of the signal sampled by the ADC pair 152 is not appropriate for the baseband processing module 164. To convert the data rate, the baseband processing module 164 further comprises a pair of rate converters 166 electrically connected to the pair of ADCs 152 for converting the data rate of signals output from the pair of ADCs 152, to a data rate suitable for the BLUETOOTH standard (i.e., 2 MHz). The most common forms of rate converters are the Farrow Interpolator and the Decimation Filter. The baseband processing module 64 is also responsible for performing detection, demodulation, time and frequency synchronization, decoding, and de-scrambling of signals modulated under the FSK format of the BLUETOOTH standard. Since the 40 MHz data rate output by the ADC pair 152 is converted to a 2 MHz data rate suitable for the BLUE- TOOTH baseband processing module 164, the tasks of the baseband processing module 164 can be performed correctly. Further, the baseband processing modules 154 and 164 can process signals at the same time.

Utilization of rate converters can bring distortion into signals. The modulation format of IEEE 802.11a is more complicated than that of the BLUETOOTH modulation format. That is, 64 QAM is more complicated then FSK. It is known that a simpler modulation format is more robust against distortion. Consequently, another reason for choosing the sampling rate of the pair of ADCs 152 to be twice the data rate of the IEEE 802.11a standard, is that it is consequently not necessary to adopt the rate converters in the baseband processing module 154, and hence there is no further distortion to the IEEE 802.11a signal. Also, according to the Nyquist theorem and as indicated above, the sampling rate of the ADCs 152 must be at least twice the highest data rate of all supported standards; that is, higher than or equal to 40 MHz in this example.

Fourth Embodiment

Figure 8:
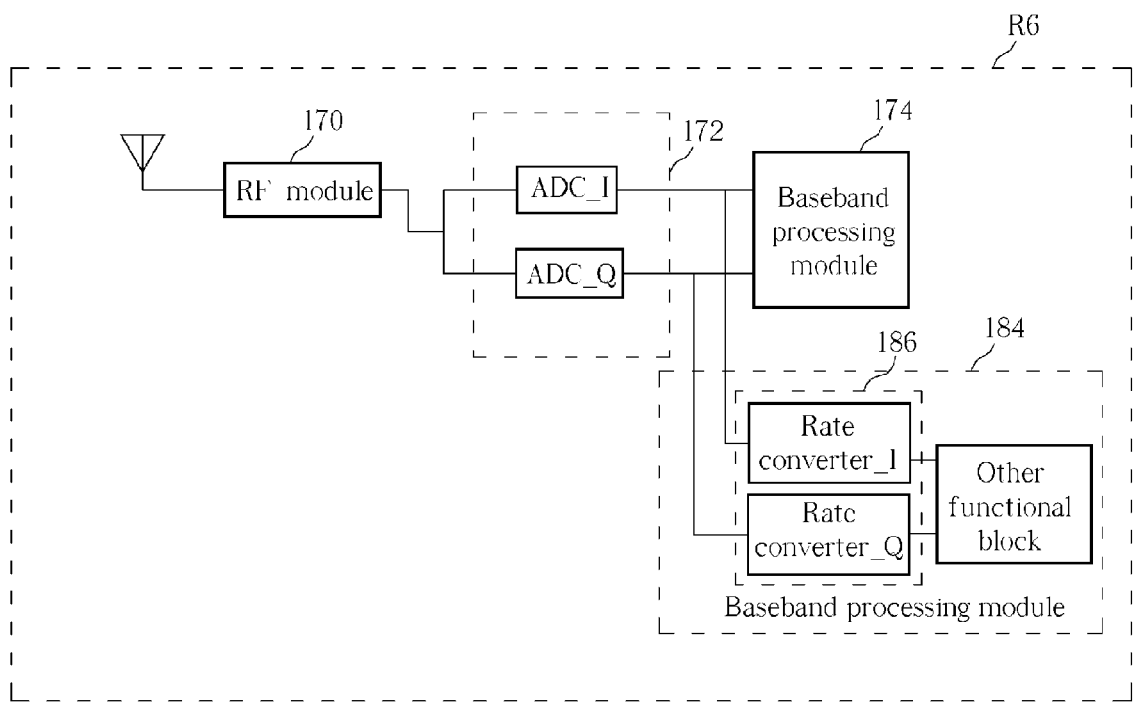
FIG. 8 is a block diagram of a present invention multi-standard receiver having a zero-IF structure that supports standards in which the radio frequency bands are close to one another but the data rates are different.

Please also refer to FIG. 8. FIG. 8 is a block diagram of another two-standard receiver R6 according to the present invention. The receiver R6 is a zero-IF radio architectured receiver for an access point (AP) supporting both IEEE 802.11b and BLUETOOTH systems. The radio frequency bands are both around 2.4 GHz and the data rates are 22 MHz and 1 MHz respectively. Since the radio frequency bands are overlapping, a single RF module 170 is utilized and shared for the two modulation standards. A pair of ADCs 172 is electrically connected to the RF module 170. The modulation format of IEEE 802.11b is QPSK, and that of BLUETOOTH is FSK. FSK is less prone to distortion than QPSK. According to the principle for choosing the sampling rate of the ADCs as described above, the sampling rate of the ADCs is chosen to be twice the data rate of IEEE 802.11b modulation format, that is, 44 MHz. Two baseband processing modules 174 and 184 are electrically connected to the pair of ADCs 172. The baseband processing module 174 is responsible for performing detection, demodulation, time and frequency synchronization, decoding, and de-scrambling of signals modulated under the QPSK format for the IEEE 802.11b standard. To convert the output data rate of the paired ADCs 172, the baseband processing module 184 further comprises a pair of rate converters 186 respectively electrically connected to the pair of ADCs 172 for converting the data rate of the signal output from the pair of ADCs 172 to a data rate suitable for the BLUETOOTH standard (i.e., 2 MHz). The baseband processing module 184 is responsible for performing detection, demodulation, time and frequency synchronization, decoding, and de-scrambling of signals modulated under the FSK format for the BLUETOOTH standard. Since the data rate is converted, the task of the baseband processing module 184 can be performed correctly. Further, the baseband processing modules 174 and 184 can process signals at the same time.

In summary, the present invention uses only one ADC for non-I/Q structured signals or one pair of ADCs for I/Q structured signals in a radio receiver supporting multiple modulation formats. The sampling rate of the only one ADC or the only one pair of ADCs has to satisfy two requirements: (1) The sampling rate must be at least twice the highest data rate of all supported standards; and (2) the data rate should be n times the data rate of the most complicated modulation format, where n is an integer. Having the data rate an integer multiple of the most complicated format helps to avoid utilizing a rate converter in the baseband processing module of the most complicated modulation format, and thus avoids signal distortion.

Figure 9:
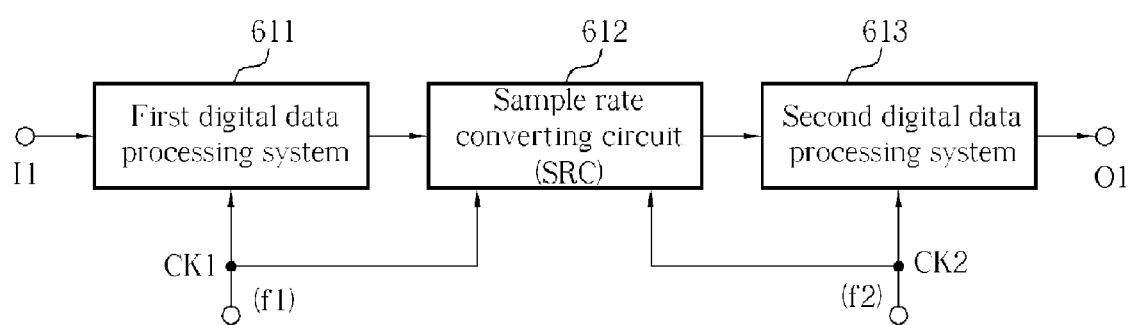
FIG. 9 is a block diagram schematically showing an SRC.
Figure 10:
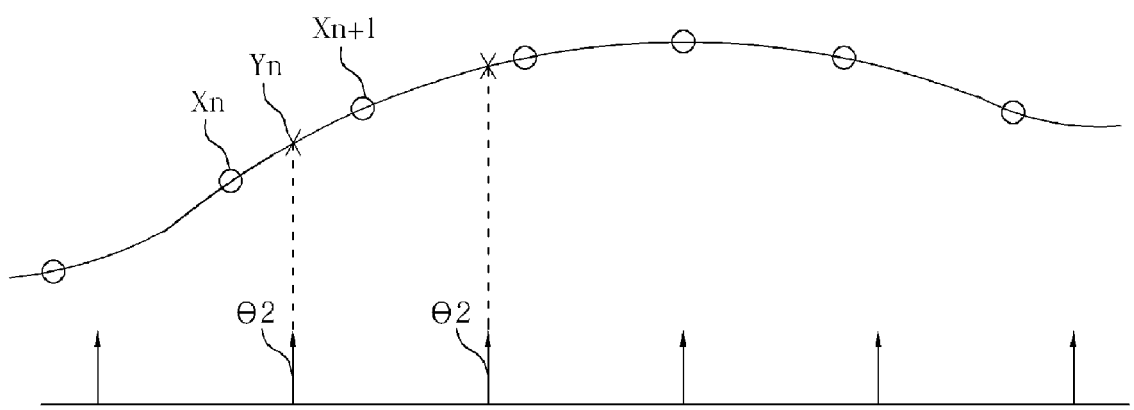
FIG. 10 is a view for explaining the operating characteristics of the SRC in FIG. 9.

Please refer to FIG. 9 and FIG. 10. FIG. 9 is a block diagram schematically showing an SRC (sample rate converter) 612. FIG. 10 is a view for explaining the operating characteristics of the SRC 612. The SRC 612 is used to convert a sample rate of data output from a first digital data processing system 611 into a rate suitable for data processing in a second digital data processing system 613. The first digital data processing system 611 is for processing input data in accordance with clock signal CK1 of frequency f1; and the second digital data processing system 613 is for processing input data in accordance with clock signal CK2 of frequency f2, being different from frequency f1.

When the first digital data processing system 611 is applied to the input terminal I1 described above, it comprises an A/D conversion section for A/D converting an analog signal. The respective circuit components of the first digital data processing system 611 process input data using clock signal CK1, having frequency f1, and output digital data of f2 rate as a system output. In this application, the second digital data processing system 613 comprises an interpolating circuit for processing input data using clock signal CK2, having a frequency of f2.

The operation principle of SRC 612 will now be described with reference to FIG. 10. Reference symbols Xn and Xn+1 denote Xnth and (Xn+1)th data output from first digital data processing system 611. Data Xn and Xn+1 are synchronized with clock signal CK1. In order to supply these data to system 613, which is operated in response to clock CK2, data Yn can be obtained at a timing of phase θ2 of clock signal CK2, and supplied to system 613. For this purpose, data Xn and Xn+1 can be linearly interpolated. This interpolation coefficient can be obtained by obtaining the phase relationship between clock signals CK1 and CK2.

In contrast to the prior art, the present invention radio receiver R3, R4 can support multiple I/Q modulation formats with a single pair of ADCs so that the circuit has a reduced complexity, the area of the circuit is reduced, and costs are thereby decreased. In addition, the present invention provides a power control module that forces unnecessary baseband processing modules into a low-power state, thereby conserving power. Further, the present invention radio receiver R5, R6 can support multiple modulation formats with a single pair of ADCs so that the circuit has a reduced complexity, the area of the circuit is reduced and costs are thereby decreased.

Those skilled in the art will readily observe that numerous modifications and alterations of the method and device may be made while retaining the teachings of the invention. Accordingly, the above disclosure should be construed as limited only by the metes and bounds of the appended claims.

What is claimed is:

1. A method for a wireless receiver capable of handling signals of different modes by a common ADC (analog-to-digital converter), comprising;
    receiving a transmitted radio frequency (RF) signal;
    down-converting the transmitted RF signal into a baseband signal;
    analog-to-digital converting the baseband signal into a primary digital signal with a basic data rate by the common ADC (analog-to-digital converter);
    processing the primary digital signal according to a first data rate not higher than the basic data rate to detect whether the primary digital signal with the first data rate carries information of a first predetermined mode;

down-converting the primary digital signal into a second data rate lower than the basic data rate and then processing the primary digital signal according to the second data rate to detect whether the primary digital signal with the second data rate carries information of a second predetermined mode; and temporarily stopping processing the primary digital signal according to the second data rate when the information in the primary digital signal meets the first predetermined mode, or temporarily stopping processing the primary digital signal according to the first data rate when the information in the primary digital signal meets the second predetermined mode;

wherein the basic data rate is an integer multiple of the data rate of a least distortion-tolerant modulation format corresponding to one of the first predetermined mode and the second predetermined mode.

2. The method of claim 1, wherein the first data rate is the same as the basic data rate.

3. The method of claim 1, wherein the basic data rate is an integer multiple of the first data rate.

4. The method of claim 1, wherein the first data rate is lower than the basic data rate and the step of processing the primary digital signal according to the first data rate comprises a step of down-converting the basic data rate into the first data rate.

5. The method of claim 1, wherein the first predetermined mode is global system for mobile communications-1800 (GSM-1800) and the second predetermined mode is wideband code division multiple access (WCDMA).

6. The method of claim 1, wherein the first predetermined mode is orthogonal frequency division multiplexing (OFDM) mode and the second predetermined mode is direct sequence spread-spectrum/complementary code keying (DSSS/CCK) mode.

7. The method of claim 1, before the steps of processing the primary digital signal, comprising a step of filtering adjacent channel interference in the primary digital signal with a basic data rate.

8. A wireless receiver capable of handling signals of different modes, comprising:
an antenna for receiving transmitted radio frequency (RF) signal;
an RF module for down-converting the transmitted RF signal into a baseband signal;
a common ADC (analog-to-digital converter) for analog-to-digital converting the baseband signal into a primary digital signal with a basic data rate;
a first baseband processing module for processing the primary digital signal according to a first data rate not higher than the basic data rate to detect whether the primary digital signal with the first data rate carries information meeting a first predetermined mode;
a second baseband processing module comprising:
a sample rate converter for down-converting the basic data rate into a second data rate lower than the basic data rate; and
a baseband processor for processing the primary digital signal with the second data rate to detect whether the primary digital signal with the second data rate carries information meeting a second predetermined mode; and
a power control module for temporarily switching one of the first and second baseband processing modules into a power saving mode when the other of the first and second baseband processing modules detects that the primary digital signal carries information meeting a corresponding predetermined mode;
wherein the basic data rate is an integer multiple of the data rate of a least distortion-tolerant modulation format corresponding to one of the first predetermined mode and the second predetermined mode.

9. The wireless receiver of claim 8, wherein the power control module is capable of switching all of the baseband processing modules into a full power mode when transmission procedures of a full-powered baseband processing module are completed.

10. The wireless receiver of claim 8, wherein the basic data rate is the same as the first data rate.

11. The wireless receiver of claim 8, wherein the first data rate is lower than the basic data rate and the first baseband processing module further comprises a sample rate converter for down-converting the basic data rate into the first data rate.

12. The wireless receiver of claim 8, wherein the first predetermined mode is global system for mobile communications-1800 (GSM-1800) and the second predetermined mode is wideband code division multiple access (WCDMA).

13. The wireless receiver of claim 8, wherein the first predetermined mode is orthogonal frequency division multiplexing (OFDM) mode and the second predetermined mode is direct sequence spread-spectrum/complementary code keying (DSSS/CCK) mode.

14. The wireless receiver of claim 8, wherein the sample rate converter is a Farrow interpolator or a Decimation Filter.

15. The wireless receiver of claim 14, wherein each baseband processing module comprises a Farrow interpolator for time recovery.

* * * * *